United States Patent [19]

Kushibiki et al.

[11] Patent Number: 4,840,473
[45] Date of Patent: Jun. 20, 1989

[54] OPTICAL DEVICE

[75] Inventors: Nobuo Kushibiki, Ebina; Noriyuki Nose, Sagamihara; Toshiyuki Nakajima, Atsugi; Takeshi Baba, Atsugi; Masakazu Matsugu, Atsugi; Yukichi Niwa, Atsugi, all of Japan

[73] Assignee: Canon Kabushiki Kaisha, Tokyo, Japan

[21] Appl. No.: 908,725

[22] Filed: Sep. 18, 1986

[30] Foreign Application Priority Data

Sep. 27, 1985 [JP] Japan .................. 60-215493

[51] Int. Cl.⁴ ............................................. G02B 27/40
[52] U.S. Cl. ................................... 350/484; 350/419
[58] Field of Search ............... 350/484, 487, 418, 419

[56] References Cited

U.S. PATENT DOCUMENTS 4,614,405 9/1986 Brandenberg et al. ............ 350/286

FOREIGN PATENT DOCUMENTS 56-62202A 7/1981 Japan .
0176017 9/1985 Japan .................... 350/286

Primary Examiner—Bruce Y. Arnold
Assistant Examiner—Rebecca D. Gass
Attorney, Agent, or Firm—Fitzpatrick, Cella, Harper & Scinto

[57] ABSTRACT

An optical device is composed by sandwiching a deformable member between sandwiching members. The deformable member has a shear modulus decreasing toward the inside. The deformable member may be a combination of a core and a coating with different shear moduli or a single body having a continuoudly decreasing shear modulus. The sandwiching members may be a flat plate either transparent or opaque or a lens with or without reflecting film. Because of inner soft and outer hard elastic nature of the deformable member, the sandwiching members can easily change their relative position to change an optical path and an imaging position of the optical device with good durability.

9 Claims, 4 Drawing Sheets

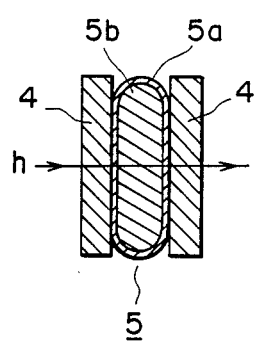 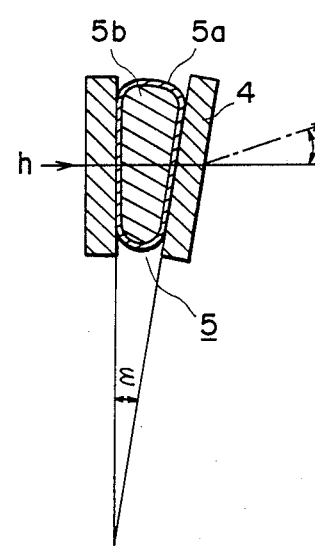 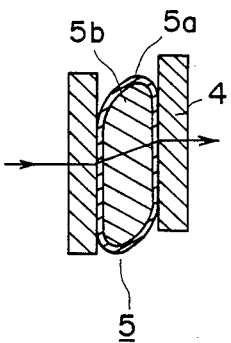
FIG. 1A    FIG. 1B    FIG. 1C
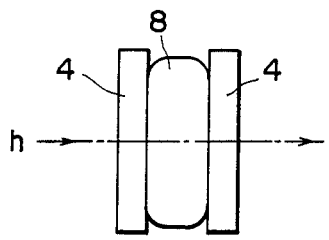 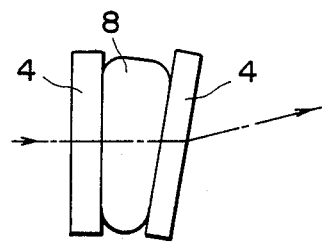
FIG. 2A    FIG. 2B
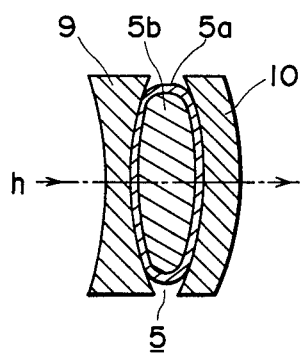 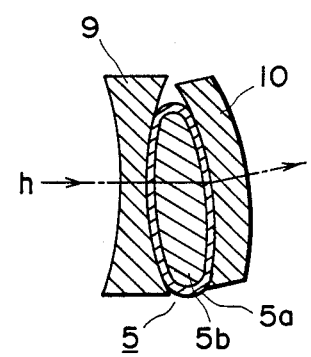
FIG. 3A    FIG. 3B

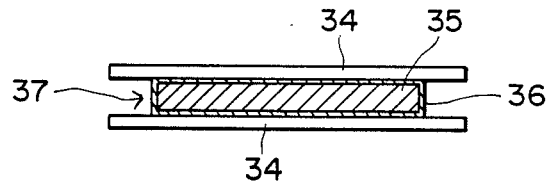
FIG. 7
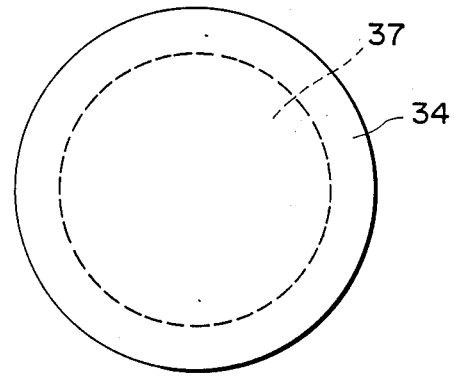
FIG. 8
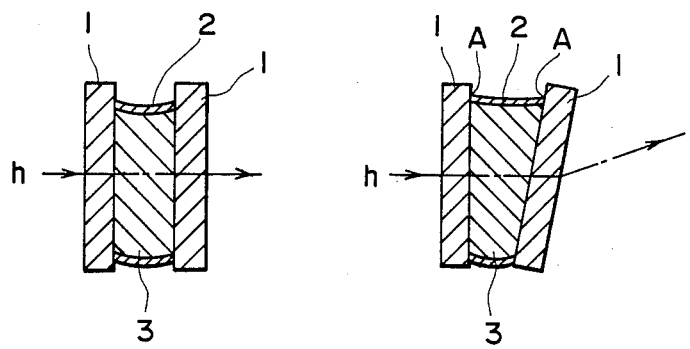
FIG. 9A
PRIOR ART
FIG. 9B
PRIOR ART

OPTICAL DEVICE

FIELD OF THE INVENTION AND RELATED ART

The present invention relates to an optical device capable of changing an imaging position.

Optical devices such as a variable apical angle prism and variable thickness parallel flat plates are useful for focusing or formation of antivibration optical systems. The devices of the prior art known as devices of this kind include a device in which a liquid is sealed between two parallel flat plate glasses; a device in which a liquid is sealed within a rubber film, and the resultant composite is sandwiched between two parallel flat plate glasses and deformed under pressurization; etc.

An example of such a known device is shown in FIGS. 9A and 9B.

The optical device shown in these figures comprises two parallel flat plate glasses connected with each other through a tubular elastic member (e.g., of rubber) 2, and a liquid 3 enclosed in a region defined by the parallel flat plate glasses 1 and the elastic member 2. The two flat plate glasses thus disposed are variable in their relative position, so that the prism action of light deflection can be changed. In FIGS. 9A and 9B, the driving source and mechanism for relatively moving the parallel flat plate glasses are omitted from showing.

The device as described above, however, involves the following problems.

(1) It is required to bond the flat plates 1 and the elastic member 2 by adhesion or melt-bonding, so that the connection portions A between the plates 1 and the elastic member 2 are liable to cause peeling when subjected to a long period of elongation and contraction. Thus, there is a problem in respect of durability.

(2) In order to increase the prism angle formed between the flat plate glasses, the part of the elastic member 2 placed on the contraction side considerably contracts, while the part of the elastic member 2 on the elongation side is required to be elongated to a considerable extent, as shown in FIG. 9B. As a result, the prism angle cannot be made large in view of poor durability of the connecting portions A in the above device structure, so that the relative displacement between the flat plates 1 has to be restricted to a small extent.

(3) Further, when the parallel plates 1 are required to be relatively moved so as to cause twisting or moved to cause displacement in a direction perpendicular to the optical axis h, and if the degree of relative movement is large, the connecting portions A can also be broken. As a result, the relative movement of the flat plates 1 is severely restricted in respect of both the amount and degree of freedom.

SUMMARY OF THE INVENTION

An object of the present invention is to provide an optical device capable of changing imaging positions which has a simple structure and is excellent in durability, by solving the above mentioned problems of the conventional device.

According to the present invention, there is provided an optical device comprising a plurality of sandwiching members and a deformable member sandwiched by the plurality of sandwiching members, the shear modulus or modulus of rigidity of the deformable member decreasing from the surface toward the inside.

In the optical device according to the present invention, the deformable member is disposed to be sandwiched by the plurality of sandwiching members, so that there is no connecting portion between sandwiching members and a deformable member as is in the conventional device. For this reason, the optical device according to the present invention is excellent in durability and the sandwiching members are allowed to cause a large degree of movement. Further, as the deformable member has a shear modulus (or modulus of rigidity) decreasing in the direction toward the inside, only a small force is required to cause a relative movement of the sandwiching members.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A, 1B and 1C are sectional views showing an embodiment of the optical device according to the present invention in various states;

FIGS. 2A and 2B are side views of another embodiment of optical device of the invention;

FIGS. 3A and 3B are sectional views showing still another embodiment of the optical device of the invention;

FIG. 7 is a side view of an embodiment of the optical device of the invention, and FIG. 8 is a plan view of the embodiment; and FIGS. 9A and 9B are sectional views showing an example of a known optical device.

DETAILED DESCRIPTION OF PREFERRED EMBODIMENT

Figure 4A:
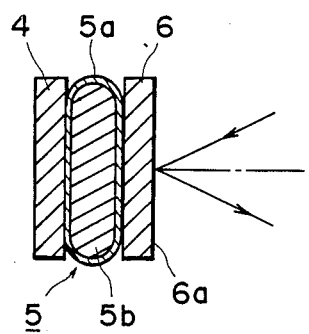
FIGS. 4A and 4B are sectional views showing a further embodiment of the optical device of the invention.

FIGS. 1A, 1B and 1C are sectional views showing an embodiment of the optical device according to the present invention. The optical device comprises sandwiching members 4 composed of a pair of transparent flat plates, and a deformable member 5 disposed between the parallel flat plates 4 and capable of freely changing its shape. The deformable member 5 does not have a uniform shear modulus but has a lower shear modulus at the central portion thereof than that in the vicinity of the surface thereof.

In the embodiment shown in FIGS. 1A–1C, the deformable member 5 comprises two portions, i.e., a core 5b of a lower shear modulus and an elastic coating 5a of a higher shear modulus covering the core 5b. In other words, the deformable member 5 shown in FIG. 1, as different from the conventional one, has a structure comprising a bag 5a of an elastic body having a higher shear modulus and a core 5b enclosed in the bag 5a. Because of this structure, the deformable member 5 can cause a large degree of deformation, is excellent in durability and allows a considerably increased freedom in movement of the flat plates 4, as it is free of a connecting portion (like the connecting portion A in FIG. 9B) between a deformable member and flat plates as in the conventional device.

In a case where the deformable member 5 is composed of two parts as shown in FIGS. 1A–1C, the core 5b may comprise an elastic body of a very low shear modulus, which may be preferably $1 \times 10^2$ to $5 \times 10^5$ dyne/cm$^2$, more preferably $1 \times 10^3$ to $1 \times 10^5$ dyne/cm$^2$. On the other hand, the outer elastic body 5a may preferably have a shear modulus of $1 \times 10^4$ to $1 \times 10^9$ dyne/cm$^2$, more preferably $5 \times 10^5$ to $1 \times 10^8$ dyne/cm$^2$, most preferably $5 \times 10^5$ to $1 \times 10^7$ dyne/cm$^2$. The ratio of shear modulus of the outer elastic body to the inner elastic body may preferably 10 or more, particularly in the range of $10^2$ to $10^3$.

The shear modulus (or modulus of rigidity) used herein may be defined as a shear modulus measured by using a rheometer comprising a pair of circular plates or a combination of a circular plate and a cone (ASTM D-4065). A commercially available example of such a rheometer is Universal Rheometer RDS 700 mfd. by Rheometrics Co.

Incidentally, an optical device is used at room temperature in most cases but may also be used at an elevated temperature or a lower temperature, so that the above mentioned ranges of shear modulus for the present invention are defined at a temperature at which the optical device is used.

It is preferred that the deformable member 5 and the flat plates 4 are disposed to provide a so-called optical contact free of an air layer therebetween.

The pair of flat plates 4 can change their relative position by a small external force. Thus, the optical device according to the present invention can vary an imaging position by changing the relative position of the flat plates 4. FIG. 1B shows a state wherein an external force is applied to the parallel flat plates 4 so that their relative positions are changed to change the optical path. More specifically, FIG. 1B shows a case where the angle $\epsilon$ between the flat plates is changed so as to deflect the optical path by an angle $\theta$ while the volume of the core 5b is retained constant and the distance between the flat plates 4 on the optical path h is not changed.

The direction of change in relative position of the flat plates 4 is arbitrarily selected. For example, the flat plates 4 may be moved relatively in a direction perpendicular to the optical axis h as shown in FIG. 1C, or may be moved so that the relative movement has both a parallel component and a perpendicular component with respect to the optical axis h. Further, the flat plates are relatively rotated about an rotational axis in parallel with the optical axis h.

In the deformable member according to the present invention, the elastic function thereof is mainly given by the outer portion of a high elasticity. And the inner portion of the deformable member 5 is rendered to have a shear modulus which is lower than that of the outer portion, so that the force for driving the flat plates is decreased. The outer portion of the deformable member 5 is mainly responsible for the elastic function of the deformable member and is desired to show a Hooke's elasticity on the stress-strain curve and a large yield strength.

FIGS. 2A and 2B are side views showing another embodiment of the optical device according to the present invention, which comprises a pair of flat plates 4 and a deformable member 8 composed of a single elastic body. Thus, the deformable member 8 comprises a continuous deformable elastic body which has a shear modulus continuously decreasing toward the inside. The portion in the vicinity of the deformable member shows a dynamic characteristic providing a low shear modulus, so that only a small force is required for driving the flat plates 4. The shear modulus of the deformable member should preferably have a maximum shear modulus in the range of $1 \times 10^4$ dyne/cm$^2$ to $1 \times 10^9$ dyne/cm$^2$, more preferably $5 \times 10^5$ dyne/cm$^2$ to $1 \times 10^8$ dyne/cm$^2$, most preferably $5 \times 10^5$ dyne/cm$^2$ to $1 \times 10^7$ dyne/cm$^2$, and a minimum shear modulus in the range of $1 \times 10^2$ dyne/cm$^2$ to $5 \times 10^5$ dyne/cm$^2$, particularly $1 \times 10^3$ dyne/cm$^2$ to $1 \times 10^5$ dyne/cm$^2$. The ratio of the shear modulus of the surface portion to that of the innermost portion should preferably be 10 or larger, more preferably in the range of $10^2$ to $10^3$. Such a deformable member 8 of a continuous deformable elastic body may for example be produced by exposing an uncured photocurable silicone resin of a desired shape to light uniformly from the outside. The attenuation of exposure light through the resin allows a softer inner portion to remain.

FIGS. 3A and 3B show still another embodiment of the present invention, which comprises lenses 9 and 10, as examples of transparent members with a curvature, in place of the flat plates 4 shown in FIGS. 1A–1C.

The optical device according to the present invention is effective, e.g., as a compensating optical element for unintentional vibration or movement of a camera optical system such as a TV camera and a still camera. In such a case, it is possible that not only a change in prism angle as shown in FIG. 1B but also a translational movement in a direction perpendicular to the optical axis or a rotational movement about an rotational axis parallel to the optical axis of the flat plates is required.

Figure 4B:
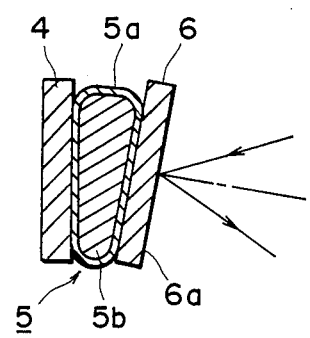

FIGS. 4A and 4B illustrate an embodiment of the optical device according to the present invention constituted to form a reflection optical system. Referring to FIGS. 4A and 4B, a flat plate 6 is provided with a metal reflection film 6 of, e.g., Al or Cr on one face thereof. The other flat plate 4 may be either transparent or opaque. The optical device shown in FIGS. 4A and 4B may be used as an optical system in which the optical path is changed with the elapse of time by applying a pressure to displace the flat plate 6. Incidentally, a solid member with a curvature such as a lens may be used instead of the flat plate 6.

The deformable member 5 has a low shear modulus at the central portion than at the surface portion. The elastic material of a low shear modulus forming the central portion may preferably comprise a gel showing a rubber-like elasticity. Such an elastomeric gel need not be chemically crosslinked as caused by sulfur or peroxides but may comprise quasi-crosslinking sites based on hydrogen bond, coordinate bond or dipole-dipole interaction between molecules.

In a case where the deformable member comprises two parts as shown in FIGS. 1A–1C, the outer elastic member 5a should preferably have a shear modulus of $1 \times 10^4$ dyne/cm$^2$ or larger, further preferably $5 \times 10^5$ dyne/cm$^2$ or larger. However, the particular shear modulus to be adopted may appropriately be adjusted in connection with the thickness of the elastic member 5a, i.e., smaller as the thickness increases. A thickness of the order of 0.5 mm may be taken as a rough measure of preparation when the entire thickness is of the order of 5 mm.

An elastic body of a low shear modulus, e.g., for providing a core 5b may for example be composed of a rubbery polymer or elastomer such as natural rubber or a synthetic rubber including polybutadiene, polychloroprene or polyisoprene, silicone rubber, or a lightly vulcanized product of these materials so as to provide a low shear modulus. Further, the elastic body of a low shear modulus may be a so-called acrylic gel which has been obtained by swelling a crosslinked polymer of acrylic acid, methacrylic acid or a derivative of these alone or in combination with water or an organic solvent. Further, a low molecular-weight elastic gel obtained by dissolving dialkylaluminum monohydroxide in a hydrocarbon may also be used for this purpose.

An elastic body of a high shear modulus, e.g., for providing an elastic member 5a may for example be composed of a natural or synthetic rubber formulated to provide a high shear modulus. Further, the elastic body of a high shear modulus may also be an elastomer which can be thermoplastic. Examples of such an elastomer include ethylene-propylene copolymer, vinyl or oleffin-diene copolymers such as ethylene-propylenediene copolymer, styrene-butadiene copolymer, styrene-butadiene-styrene copolymer, styrene-isoprene copolymer, styrene-isoprene-styrene copolymer; copolymers of ethylene and (meth)acrylic acid, a derivative thereof or an organic vinyl ester such as vinyl ester from which ethylenic crystalline structure has disappeared; polyester elastomer, polyurethane elastomer, etc.

An additive for polymer such as a plasticizer can be mixed with an elastic material of a low or high shear modulus to control the shear modulus. It is also well known that the shear modulus can be controlled by changing the molecular weight or the number of crosslinking sites. As a result, the low shear modulus elastic material and the high shear modulus elastic material may essentially have the same chemical structure or may comprise different chemical structures. An example of elastomer which can easily change its shear modulus while retaining basically the same chemical structure is silicone rubber. Such a silicone rubber may be produced by addition of a compound having a polysiloxane main chain and a terminal and/or a side vinyl group to a polysiloxane having a terminal and/or a side hydrogenated siloxane unit in the presence of a catalyst such as platinum. In this instance, for a same polymerization degree, a higher shear modulus may be obtained by increasing the amounts of the vinyl groups acting as crosslinking sites, and a lower shear modulus may be obtained by decreasing the amounts of the vinyl groups. Further, the shear modulus can be changed by adding a polysilocane having no reactivity, or can be increased by adding silica gel providing quasi-crosslinking sites in an amount not causing an optical problem. These are conventional techniques for controlling the rigidity or shear modulus and may be applied, as desired, to the present invention.

The deformable member 5 shown in FIGS. 1A-1C may for example be prepared in the following manner. A low rigidity gel 5b adjusted to a prescribed shear modulus is coated with a higher rigidity elastic member 5a by dipping the gel into or spraying of a solution, emulsion or suspension of a polymer providing the higher rigidity elastic member 5a, followed by drying. The thickness of the elastic member 5a may be adjusted by controlling the concentration of the polymer and the number of dipping or spraying-drying cycles. The crosslinking, if desired, may be effected by carrying out the drying at a temperature above the crosslinking initiation temperature or effected after a sufficient thickness of the film is formed. The crosslinking may also be caused by photoreaction. If the kind of elastomer used is, e.g., diene rubber, ethylene-propylene copolymer, or styrene-butadiene copolymer, it may be sufficient only to melt the elastomer, followed by dipping or spraying thereof.

Next, some methods of driving the optical device according to the present invention are explained. The optical device according to the invention may be driven by mechanically applying a force to, e.g., sandwiching members such as flat plates 4 or lenses 9 and 10 by means of a screw or a cam. Alternatively, a piezoelectric element or an electromagnet may be used as the driving device.

As other methods of driving, there may also be utilized a stepping motor, a thermal expansion, a volumetric change accompanying a sol-gel transformation caused by a temperature or H change, or a shape-memorizing alloy.

Figure 5A:
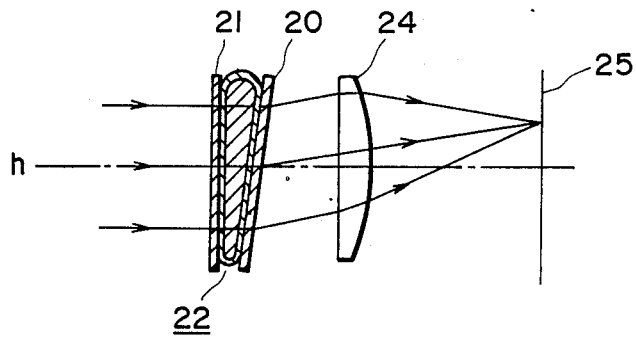
FIGS. 5A, 5B, and FIGS. 6A, 6B are, respectively, side views showing an example of the application of the optical device of the invention.
Figure 5B:
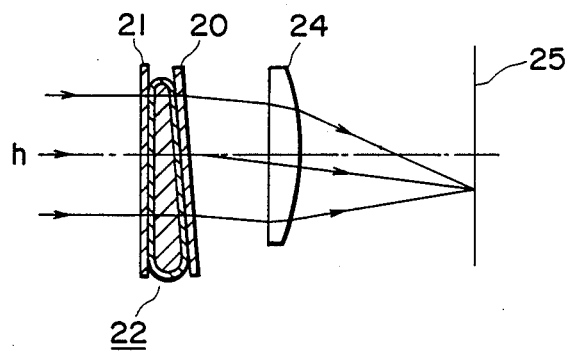

Some examples of applied optical systems using the optical device according to the invention will now be explained. FIGS. 5A and 5B show an example of an optical system whereby tracking is easily effected corresponding to a detected tracking error.

Referring to FIGS. 5A and 5B, a flat plate glass 21 is fixed with respect to an objective lens 24. On the other hand, a flat plate glass 20 is disposed closer to the objective lens 24 so as to freely rotate or change an angle with the flat plate 21 while retaining a constant distance from the flat plate 21 on the optical axis h. The member 22 is substantially the same as the deformable member 5 shown in FIG. 1. As a result of the rotation or swinging of the flat plate 20, the optical angle of the variable apical angle prism formed in combination with the flat plate 21 is changed to deflect incident light, whereby a tracking is effected. The optical system shown in FIG. 5 may be utilized, e.g., for recording and reading for various conventional recording media such as optomagnetic disk and heat-mode recording medium utilizing light. A face 25 is, e.g., a recording face of an optical disk.

Figure 6A:
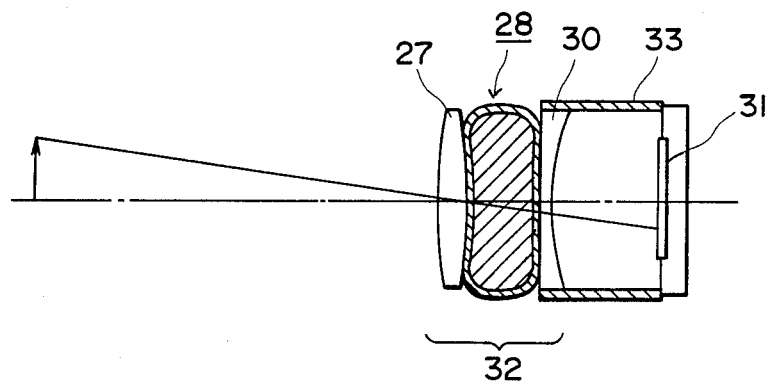
Figure 6B:
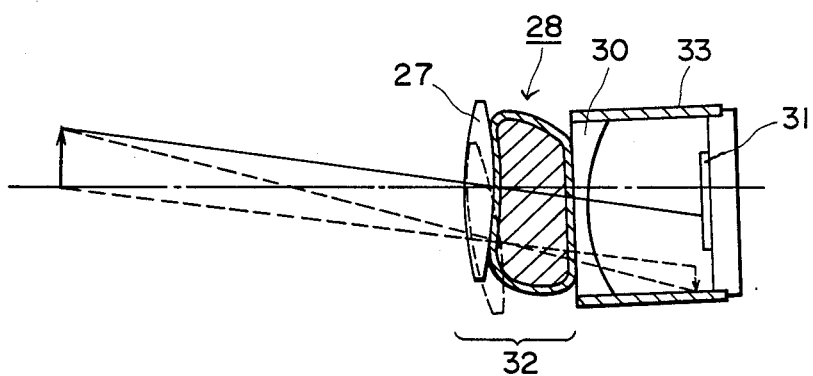

FIGS. 6A and 6B show an example of an antivibration system utilizing an optical device according to the present invention. The optical device 32 comprises lenses 27 and 30 and a deformable member 28. The lens 30 and a sensor face 31 of, e.g., an image pick-up tube are affixed to a barrel 33.

It is assumed that the barrel 31 is inclined due to vibration as shown in FIG. 6B from a state shown in FIG. 6A wherein an object is focused right on the sensor face 31. In this instance, if the lens 21 is similarly inclined as indicated by a broken line, the imaging position on the sensor face 31 is remarkably deviated as shown by a broken line from the position shown in FIG. 6A, so that awkward trembling of images is caused. If the optical device 32 according to the present invention is used, however, the lens 27 does not change its position remarkably in response to an abrupt vibration. This is because the optical device 32 is composed of a viscoelastic material, so that an abrupt change in position of the lens 27 is prevented. As a result, an abrupt change in imaging position on the sensor face 31 is alleviated as shown in FIG. 6B. In this why, in response to an abrupt vibration or rapid movement of the optical system, the image given by the sensor always moves gradually to provide a stable image.

In the above described embodiments of the present invention, a pair of flat plates or a pair of lenses are used, whereas three or more flat plates or lenses may be used in combination so that a deformable member is disposed between flat plates, between lenses, or between a flat plate and a lens.

Hereinbelow, some examples of actual production of the optical device according to the present invention will be explained.

EXAMPLE 1

An optical device according to the present invention as shown in FIGS. 7 and 8 was prepared in the following manner.

In a teflon container of 5.0 mm-depth and 45 mm diameter, an RTV (room-temperature vulcanization)-type silicone resin (Trade name: KE104 Gel, mfd. by Shinetsu Kagaku Kogyo K.K.) was charged and heat-cured at 50° C. for 3 hours. The cured product was taken out from the container to be used as a core 35. The shear modulus of the core was measured at $4 \times 10^4$ dyne/cm$^2$. On the other hand, a silicone resin for providing a high shear modulus (Trade name: KE 106, Shinetsu Kagaku Kogyo K.K.) was heated at 50° C. for 10 minutes, and the core 35 was dipped therein. Then, the silicone resin (KE 106) was cured at 60° C. to form a deformable member with a 0.5 mm-thick outer layer 36 having a shear modulus of $5 \times 10^6$ dyne/cm$^2$ as measured with respect to a sample separately cured under the same conditions. The deformable member 37 was sandwiched between two glass plates (60 mm-diameter and 2 mm-thickness) 34 respectively treated with a primer (Trade name: Primer A, Shinetsu Kagaku Kogyo K.K.) and disposed above and below the deformable member 37, whereby an optical device as shown in FIGS. 7 and 8 was prepared.

When a light beam was caused to be incident on the optical device thus prepared while changing the relative position of the glass plates 34 by applying an external force to one glass plate 34, whereby the optical path could be arbitrarily changed. The correlation between the deflection angle $\theta$ and the prims apical angle $\epsilon$ (as shown in FIG. 1B) obtained in this way are shown in the following Table 1.

TABLE 1

| $\epsilon$ (degrees) | 5 | 10 | 15 |
|---|---|---|---|
| $\theta$ (degrees) | 2 | 4 | 6 |

EXAMPLE 2

A styrene-butadiene copolymer (Trade name: Tufprene-A, mfd. by Asahi Kasei Kogyo K.K.) was dissolved in chloroform to prepare a 5%-solution. A core 35 prepared in the same manner as in Example 1 was dipped in the solution and dried after being taken out from the solution. By repeating the dipping and drying several times, a deformable member 37 having a 0.5 mm-thick outer layer 36 coating the core 35 was prepared. The outer layer 36 showed a shear modulus of $7 \times 10^6$ dyne/cm$^2$. Separately, two glass plates were treated first with vinyltrimethoxysilane and then by dipping them into a 0.5%-methanol solution of t-butyl peroxide, followed by taking out and drying. The thus treated two glass plates were used to sandwich the deformable member prepared above to form an optical device according to the present invention.

A light beam was caused to be incident on the optical device thus obtained while changing the relative position of the glass plates in the same manner as in Example 1, whereby the optical path could be artibrarily changed.

The correlation between the prism apical angle $\epsilon$ and the deflection angle $\theta$ obtained at this time are shown in the following Table 2.

TABLE 2

| $\epsilon$ (degrees) | 5 | 10 | 15 |
|---|---|---|---|
| $\theta$ (degrees) | 2.7 | 5.4 | 8.1 |

EXAMPLE 3

Into a teflon tube of 5.0 mm-thickness and 45 mm-inner diameter, the lower opening of which was covered with a 1 mm-thick quartz glass plate, a photocuring-type silicone resin (TUV 6000, mfd. by Toshiba Silicone K.K.) was charged and, after covered with a similar quartz glass plate, was exposed for 30 minutes from both sides thereof respectively to light from a 250 W-high pressure mercury lamp about 20 cm spaced apart through an attenuation filter (attenuation rate: about 30%), whereby a deformable body having a continuously changing shear modulus. The deformable member showed a shear modulus of $9.8 \times 10^5$ dyne/cm$^2$ at the superficial portion and a shear modulus of $8 \times 10^3$ dyne/cm$^2$ at the central portion. The thus prepared deformable member was sandwiched between a pair of base plates similar to those used in Example 1 to prepare an optical device according to the present invention.

A light beam was caused to be incident on the optical device thus obtained while changing the relative position of the glass plates in the same manner as in Example 1, whereby the optical path could be arbitrarily changed.

The correlation between the prism apical angle $\epsilon$ and the deflection angle $\theta$ obtained at this time are shown in the following Table 3.

TABLE 3

| $\epsilon$ (degrees) | 5 | 10 | 15 |
|---|---|---|---|
| $\theta$ (degrees) | 2 | 4 | 6 |

What is claimed is:

1. An optical device, comprising a plurality of sandwiching members and deformable member sandwiched by the plurality of sandwiching members, the shear modulus of the deformable member decreasing toward the inside thereof; said deformable member comprising an elastomeric core and an elastomeric coating covering the core; said elastomeric core having a shear modulus in the range $1 \times 10^2$ dyne/cm$^2$ to $5 \times 10^5$ dyne/cm$^2$; said elastomeric coating having a shear modulus in the range of $1 \times 10^4$ dyn/cm$^2$ to $1 \times 10^9$ dyne/cm$^2$.

2. An optical device according to claim 1, wherein said elastic coating has a shear modulus in the range of $5 \times 10^5$ dyne/cm$^2$ to $1 \times 10^8$ dyne/cm$^2$.

3. An optical device according to claim 2, wherein said elastic coating has shear modulus in the range of $5 \times 10^5$ dyne/cm$^2$ to $1 \times 10^7$ dyne/cm$^2$.

4. An optical device according to claim 1, wherein said core has a shear modulus in the range of $1 \times 10^3$ dyne/cm$^2$ to $1 \times 10^5$ dyne/cm$^2$.

5. An optical device according to claim 1, wherein said deformable member comprises silicone rubber.

6. An optical device according to claim 1, wherein the sandwiching members include a transparent flat plate.

7. An optical device comprising a plurality of sandwiching members and a deformable member sandwiched by the plurality of sandwiching members, the shear modulus of the deformable member decreasing toward the inside thereof; said deformable member having a maximum shear modulus in the range of $1\times10^4$ dyne/cm$^2$ to $1\times10^9$ dyne/cm$^2$ and a minimum shear modulus in the range of $1\times10^2$ dyne/cm$^2$ to $5\times10^5$ dyne/cm$^2$, wherein the sandwiching members include a flat plate provided with a reflecting film.

8. An optical device comprising a plurality of sandwiching members and a deformable member sandwiched by the plurality of sandwiching members, the shear modulus of the deformable member decreasing toward the inside thereof; said deformable member having a maximum shear modulus in the range of $1\times10^4$ dyne/cm$^2$ to $1\times10^9$ dyne/cm$^2$ and a minimum shear modulus in the range of $1\times10^2$ dyne/cm$^2$ to $5\times10^5$ dyne/cm$^2$, wherein the sandwiching members include a lens.

9. An optical device comprising a plurality of sandwiching members and a deformable member sandwiched by the plurality of sandwiching members, the shear modulus of the deformable member decreasing toward the inside thereof; said deformable member having a maximum shear modulus in the range of $1\times10^4$ dyne/cm$^2$ to $1\times10^9$ dyne/cm$^2$ and a minimum shear modulus in the range of $1\times10^2$ dyne/cm$^2$ to $5\times10^5$ dyne/cm$^2$, wherein the sandwiching members include a lens provided with a reflecting film.

* * * * *